(12) United States Patent
Invernizzi

(10) Patent No.: US 9,372,605 B2
(45) Date of Patent: Jun. 21, 2016

(54) METHOD AND APPARATUS FOR CONTROLLING THE OPERATION OF AN OPERATING SYSTEM AND APPLICATION PROGRAMS BY OCULAR CONTROL

(75) Inventor: Paolo Invernizzi, Milan (IT)

(73) Assignee: SR LABS S.R.L., Brescia (IT)

( * ) Notice: Subject to any disclaimer, the term of this patent is extended or adjusted under 35 U.S.C. 154(b) by 429 days.

(21) Appl. No.: 13/395,014

(22) PCT Filed: Sep. 13, 2010

(86) PCT No.: PCT/IB2010/002271
§ 371 (c)(1),
(2), (4) Date: Mar. 8, 2012

(87) PCT Pub. No.: WO2011/030212
PCT Pub. Date: Mar. 17, 2011

(65) Prior Publication Data
US 2012/0173999 A1 Jul. 5, 2012

(30) Foreign Application Priority Data

Sep. 11, 2009 (IT) ................................ FI2009A0198

(51) Int. Cl.
*G06F 3/048* (2013.01)
*G09G 5/00* (2006.01)
(Continued)

(52) U.S. Cl.
CPC ............ *G06F 3/04842* (2013.01); *G06F 3/013* (2013.01)

(58) Field of Classification Search
CPC ........... G09G 5/00; G06F 3/048; G06F 3/013; A61B 3/113
USPC ........................................................ 715/762
See application file for complete search history.

(56) References Cited

U.S. PATENT DOCUMENTS 4,950,069 A * 8/1990 Hutchinson .................. 351/210
5,471,542 A * 11/1995 Ragland ........................ 382/128
(Continued)

FOREIGN PATENT DOCUMENTS

| EP | 1679577 A1 | 7/2006 |
|---|---|---|
| WO | WO2006/045843 | 5/2006 |
| WO | WO2007/017500 | 2/2007 |

OTHER PUBLICATIONS

Kiyohiko Abe, et al. "A System for Web Browsing by Eye-gaze Input", Electronics and Communications in Japan, Scripta Technica, New York, US LNKD-DOI:10.10002/ECJ.10110, vol. 91, No. 5, May 1, 2008, pp. 11-18.

(Continued)

*Primary Examiner* — Jennifer To
*Assistant Examiner* — Hugo Molina
(74) *Attorney, Agent, or Firm* — Abelman, Frayne & Schwab

(57) ABSTRACT

The method and apparatus object of this invention refer to a system for using generic software applications by means of ocular control characterized by simple interaction techniques which minimize the cognitive effort of the user required to manipulate the software and which permit to overcome the problems resulting from the intrinsic problem of accuracy of eye-tracking systems. Indeed, such technique does not provide using the pointer of the mouse moved by means of the gaze to control the various software applications but to use a separate application which through the use of suitable interaction techniques is comfortable and does not involve an increased effort of concentration by the user. An attempt has indeed been made to simplify the process of interaction between the user and machine also by means of the use of visual feedback which allows the same operations of the mouse to be performed by the user without the typical user frustration due to the problems of accuracy of the eye-tracking device.

12 Claims, 10 Drawing Sheets

(51) Int. Cl.
*A61B 3/113* (2006.01)
*G06F 3/0484* (2013.01)
*G06F 3/01* (2006.01)

(56) References Cited

U.S. PATENT DOCUMENTS

| | | | | |
|---|---|---|---|---|
| 5,638,176 | A * | 6/1997 | Hobbs et al. | 356/519 |
| 5,731,805 | A * | 3/1998 | Tognazzini et al. | 345/156 |
| 5,844,824 | A * | 12/1998 | Newman et al. | 345/156 |
| 5,850,211 | A * | 12/1998 | Tognazzini | 345/158 |
| 5,886,683 | A * | 3/1999 | Tognazzini et al. | 715/700 |
| 5,898,423 | A * | 4/1999 | Tognazzini et al. | 345/158 |
| 5,912,721 | A * | 6/1999 | Yamaguchi et al. | 351/210 |
| 5,980,041 | A * | 11/1999 | Strachan | 351/210 |
| 6,152,563 | A * | 11/2000 | Hutchinson et al. | 351/209 |
| 6,204,828 | B1 * | 3/2001 | Amir et al. | 345/7 |
| 6,323,884 | B1 | 11/2001 | Bird et al. | |
| 6,373,961 | B1 * | 4/2002 | Richardson et al. | 382/103 |
| 6,456,262 | B1 * | 9/2002 | Bell | 345/8 |
| 6,577,329 | B1 * | 6/2003 | Flickner et al. | 715/774 |
| 6,578,962 | B1 * | 6/2003 | Amir et al. | 351/209 |
| 6,601,021 | B2 * | 7/2003 | Card et al. | 702/187 |
| 6,634,749 | B1 * | 10/2003 | Morrison et al. | 351/209 |
| 6,637,883 | B1 * | 10/2003 | Tengshe et al. | 351/210 |
| 6,724,402 | B1 * | 4/2004 | Baquero | 715/765 |
| 6,886,137 | B2 * | 4/2005 | Peck et al. | 715/785 |
| 7,206,022 | B2 * | 4/2007 | Miller et al. | 348/333.03 |
| 7,365,738 | B2 * | 4/2008 | Molander et al. | 345/157 |
| 7,401,920 | B1 * | 7/2008 | Kranz et al. | 351/210 |
| 8,185,845 | B2 * | 5/2012 | Bjorklund et al. | 715/863 |
| 8,225,229 | B2 * | 7/2012 | Thorn et al. | 715/802 |
| 2002/0105482 | A1 * | 8/2002 | Lemelson | G06F 3/0485 345/7 |
| 2004/0066414 | A1 * | 4/2004 | Czerwinski et al. | 345/781 |
| 2004/0095387 | A1 * | 5/2004 | Demsey et al. | 345/762 |
| 2005/0047629 | A1 | 3/2005 | Farrell et al. | |
| 2008/0270910 | A1 * | 10/2008 | Lukasik et al. | 715/740 |
| 2009/0086165 | A1 * | 4/2009 | Beymer | 351/210 |
| 2010/0182232 | A1 * | 7/2010 | Zamoyski | G06F 3/013 345/157 |
| 2011/0022950 | A1 * | 1/2011 | Dallago | G06F 3/013 715/256 |

OTHER PUBLICATIONS

International Search Report and Written Opinion, PCT/IB2010/002271, Feb. 28, 2011 (10 sheets).

* cited by examiner

METHOD AND APPARATUS FOR CONTROLLING THE OPERATION OF AN OPERATING SYSTEM AND APPLICATION PROGRAMS BY OCULAR CONTROL

CROSS REFERENCE TO RELATED APPLICATION

This application claims benefit under 35 U.S.C. §371 to international application No. PCT/IB2010/002271, filed on Sep 13, 2010, which claims priority to Italian application no. FI2009A000198, filed Sep. 11, 2009, the contents of which are incorporated by reference in their entirety.

FIELD OF THE INVENTION

The present invention refers to the field of systems and methods for the control of generic software applications by means of eye-tracking devices, i.e. by using ocular movements.

Not having the opportunity to use the mouse for access to the software applications, the user should take advantage of the techniques which permit him/her to carry out, by means of ocular movements, the same operations which are possible to carry out with the mouse. To this end, techniques and contrivances have been developed which permit the user to significantly decrease the cognitive effort to be performed.

STATE OF THE ART

The tracking of the ocular movements potentially offers the user the possibility of controlling the software of a personal computer by simply looking at the display thereof.

However, there are problems which frustrate the user during the use of the tracking systems of ocular movements—or eye-tracking systems—for controlling the software of a personal computer. In particular, the eyes should simultaneously behave as input and output devices, i.e. they should explore and carry out true actions. Again, the eye-tracking devices suffer intrinsic problems of accuracy in measuring the position of the gaze on the screen. Therefore, the accuracy of the sensor is always affected by an error (the difference between the current position of the cursor on the display compared with the position of the cursor wanted by the user) and this does not make controlling most of the software applications easy, given that many software programs require an accuracy of some millimeters, and others also require an accuracy assessable in terms of pixels.

Thus the use of eye-tracking systems is generally limited to software made specifically for disabled users in which a low pointing precision is required. Indeed, the user should make his/her selection from a list of relatively large cells in which the effect of the error of accuracy is small.

Instead, in the field of software applications of common use, the employment of eye-tracking systems for controlling the application, e.g. by means of the movement of the cursor which is updated many times per second by following the direction of the gaze, the error of accuracy makes the user's task very difficult, to whom a significant effort of concentration is required, which very soon generates fatigue.

Any attempt by the user to correct the error by re-directing his/her gaze towards the position where the cursor should be positioned does nothing more than making the use of the cursor increasingly problematic and tiring.

Some solutions in use in the state of the art provide resolving the aforesaid problem by means of enlarging a part of the display of the personal computer, so as to improve the accuracy in the positioning of the cursor.

However, this approach is insufficient because the error of compensation also remains in these cases, thus continuing to frustrate the user, and moreover implies an increased complexity of the interface which may create confusion and distraction.

Other solutions currently available imply the appearance of "off-screen" menus which permit the user to select which action to carry out by emulating the different operations which may be carried out with the mouse (single click, double click, right click, drag and drop).

Again, in some cases, the functions wanted may be activated by pointing the gaze on icons arranged on strips of thin plastic-coated cardboard which are positioned on the vertical perimeter of the monitor: thereby the eye should select the functions external thereto before activating them on the icon or on the function wanted and then move the cursor which will be steered by the gaze towards the icons or applications wanted.

In further other cases, it is also possible to steer a second PC, connected with the eye-tracking system, whose monitor should be installed beside the monitor of the eye-tracker to give the user the opportunity to easily observe the control of the mouse over the applications.

The directions of the mouse pointer are activated with the gaze on the screen view on the monitor of the eye-tracking device and once the direction is selected the effect is observed on the other PC; as soon as the gaze is removed from the PC wanted to be controlled, the pointer stops and the commands wanted may be selected. Thereby, the second PC connected may be steered with the eye-tracking system, by means of the emulation of the mouse.

In principle, we may assert that, contrarily to what has been implemented to date, it would be desirable to have a display on which the elements depicted do not interfere too much with the normal use of the software for the following reasons: the attention of the user declines exponentially with the increasing number of elements depicted on the screen, the user normally has little familiarity with the eye-tracking devices and moreover may be affected by cognitive disabilities such as to make the use of an eye-tracking device prohibitive.

For the aforesaid reasons, it is the object of the present invention to provide a method for controlling a personal computer by means of an eye-tracking system which overcomes the drawbacks listed above.

One of the main requirements remains that of minimizing the cognitive effort required to manipulate the software by ensuring that the interface accepts "natural" inputs and responds "naturally" and is easily comprehensible.

For this reason it will be necessary to develop an interface which uses interaction techniques which are not stressful for the user. Given that many of the inputs are unintentional, the system should interpret them correctly without producing unrequested responses caused by involuntary actions. Such system therefore should be capable of distinguishing between the true will of the user while letting him/her observe the interface peacefully if it is not his/her intention to give a command; on the other hand the user should be capable of assessing what the current status of the system is, so as to realize if his/her intentions were interpreted properly, to avoid the execution of involuntary commands.

It should also be underlined that while the systems of the state of the art control operating systems by means of the emulation of the mouse via ocular control (conversion of the movement of the gaze into movement of the cursor), the object of the present invention provides a new mapping of the "original" native interactors of the operating system of the personal computer (icons, etc.) in new interactors modified and made suitable to the selection mode by means of ocular control.

Therefore the present invention establishes a sort of "direct channel", as the emulation of the cursor is overcome by the fact that the native interactors are replaced by those modified and adapted to the need to use the gaze as input system.

Also, the use of a Virtual Machine, which permits to manage and create a virtual environment to carry out a further operating system with related software applications and which the user may use simultaneously to the one started, provides further advantages. One of them is security: a virtual machine is completely isolated and independent and a sudden crash of the virtual machine does not involve the hosting operating system to crash; therefore restarting the computer is not required but only terminating the virtual machine and starting it again while avoiding damaging e.g. the file system.

As the method according to the present invention is integrated in a communication suite, by using the virtual machine it is possible to simply, quickly and safely move (by means of suspension of the virtual machine) from using the classic PC applications, by means of the control techniques described below, to the communication suite designed specifically for being used via ocular control, thus overcoming the problems of the systems in the state of the art which provide rather complicated procedures for moving from one mode to the other.

At the same time, the user may directly choose, by means of suitable shortcuts, to carry out some predefined applications inside the communication suite thus overcoming the problem of the possible direct execution from the operating system.

SUMMARY OF THE INVENTION

The object of the present invention consists of a method and an apparatus for using a generic operating system and generic software applications connected thereto, by means of ocular control. A further object of the present invention consists of suitable methods of interaction developed by means of interaction techniques and an intuitive and easy-to-use user interface as described in the claims which form an integral part of the present description.

The method object of the present invention therefore depicts a possible implementation of an assistive technology, extremely innovative in terms of control of a generic operating system and of the applications connected thereto, based on the use of alternative and natural inputs, such as the gaze.

DETAILED DESCRIPTION OF THE INVENTION

In a preferred embodiment of the present invention, the apparatus object of the present invention comprises electronic means of data and of information processing, means for memorizing said data and information and user interfacing means.

Said electronic data and information processing means comprise a suitable control section, preferably based on at least a micro-processor, and may, e.g., be provided by a personal computer.

Said memorizing means preferably comprise hard disks and storage devices of flash type. Said user interfacing means preferably comprise data visualising means, such as e.g. displays, monitors or analogous external output units and eye-tracking devices adapted to interpret the direction of the user's gaze.

Figure 1:
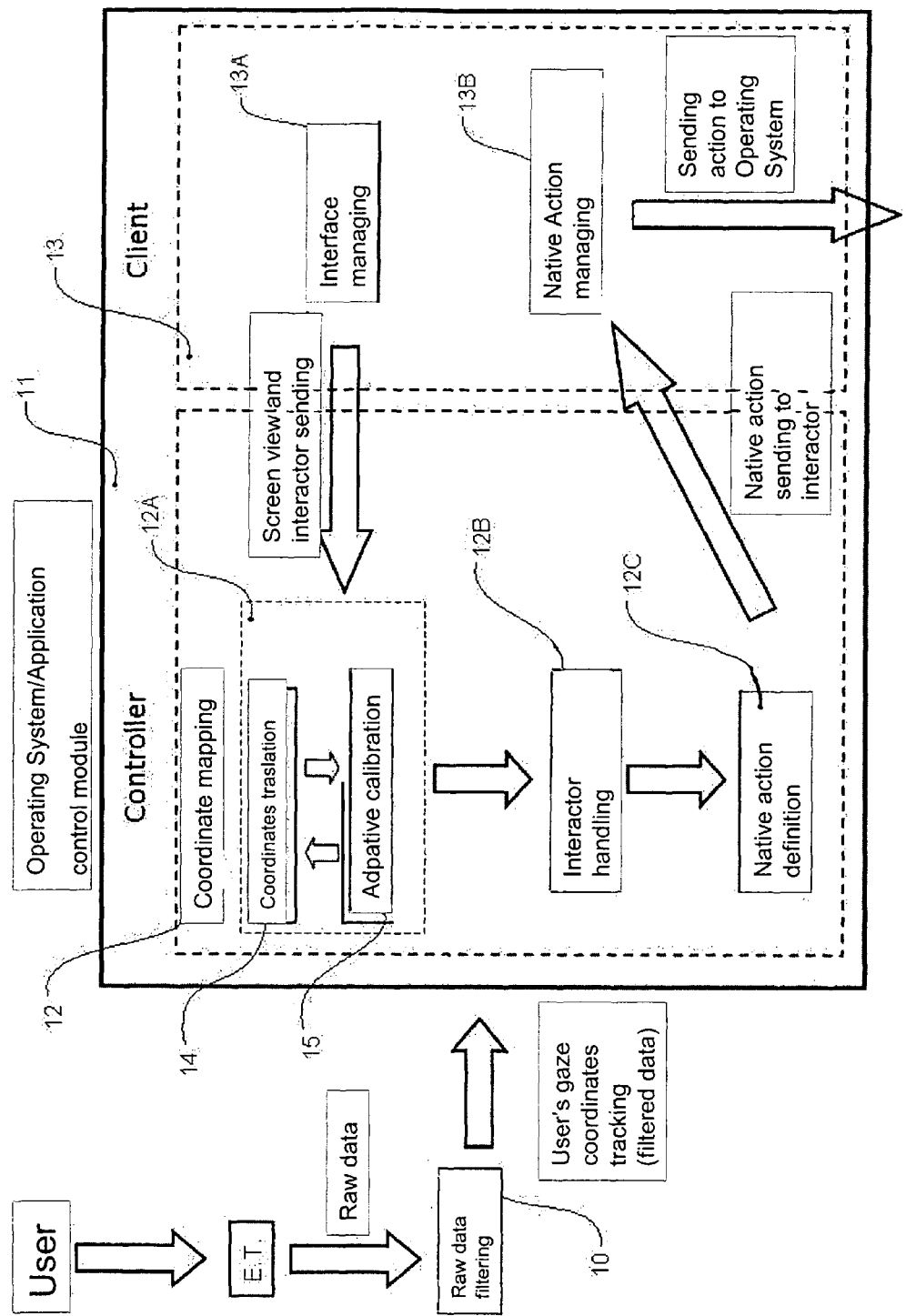
FIG. 1 shows the block diagram of the architecture of the method in accordance with the present invention.

Said micro-processor is preferably equipped with an operating system, with a suitable virtual environment by means of the use of a virtual machine and by a suitable software program which implements a method whose architecture, described in FIG. 1, comprises the following modules, in turn comprising a series of instructions adapted to performing a specific task: a filtering module 10 in which the coordinates of the user's gaze are processed so as to make the rough data coming from the used eye-tracking device more stable; a module, namely an Operating System/Applications Control 11, responsible for controlling the operating system and the applications associated therewith and for running the developing application graphic interfaces, interface which contains the information about the interactors in the screen view and carries out the native action associated with the interactor fixed by the user at that moment, said interactors being the activatable elements in the interface: the icons, the pop-down menus, the check boxes etc., adapted to make the user carry out actions on the applications program to be controlled.

Said Operating System/Applications Control Module 11 is formed by two component sub-modules: a Controller Module 12 and a Client Module 13.

Said Controller Module 12 is in charge of managing the presentation of the interactors and of defining the native action associated with each of them and in turn comprises three further modules which interact with each other:

a Coordinate Mapping Module 12A which is in charge of carrying out new mapping of the coordinates relating to the screen views and to the interactors therein (different between Client and Controller);

an Interactor Managing Module 12B which is in charge of carrying out the comparison with the incoming gaze to define which interactors are fixed by the user and presents them, suitably and possibly modified, on the interface, e.g. on a side panel;

a Native Action Definition Module 12C which is in charge of defining the native action associated with each interactor of the Operating System and of sending it to said Client Module 13, thus making it available for successive processing.

Said Coordinate Mapping Module 12A in turn consists of two sub-modules which interact with each other: a Coordinates Translation Sub-Module 14 which carries out a translation of the coordinates relating to screen views and interactors and an Adaptive Calibration Sub-Module 15 which carries out a further re-adjustment of the coordinates by means of geometrical deformation of the plane obtained by comparing the information on the interactors which the user may select and the coordinates of the gaze coming from the eye-tracker, the results of the combined actions of these 2 modules is the one described above concerning the Coordinates Mapping Module 12A.

Said Client Module 13 is adapted to defining the position and the function of the interactors in the screen view and in turn comprises two further modules which interact with each other: the Interface Managing Module 13A which is in charge of analysing the screen views and sending the information relating thereto and to the present interactors, detected by means of different search methods, to the Controller Module 12; the Native Action Managing Module 13B which is in charge of receiving the information relating to the associated native action and of carrying it out as action on said operating system.

Figure 2:
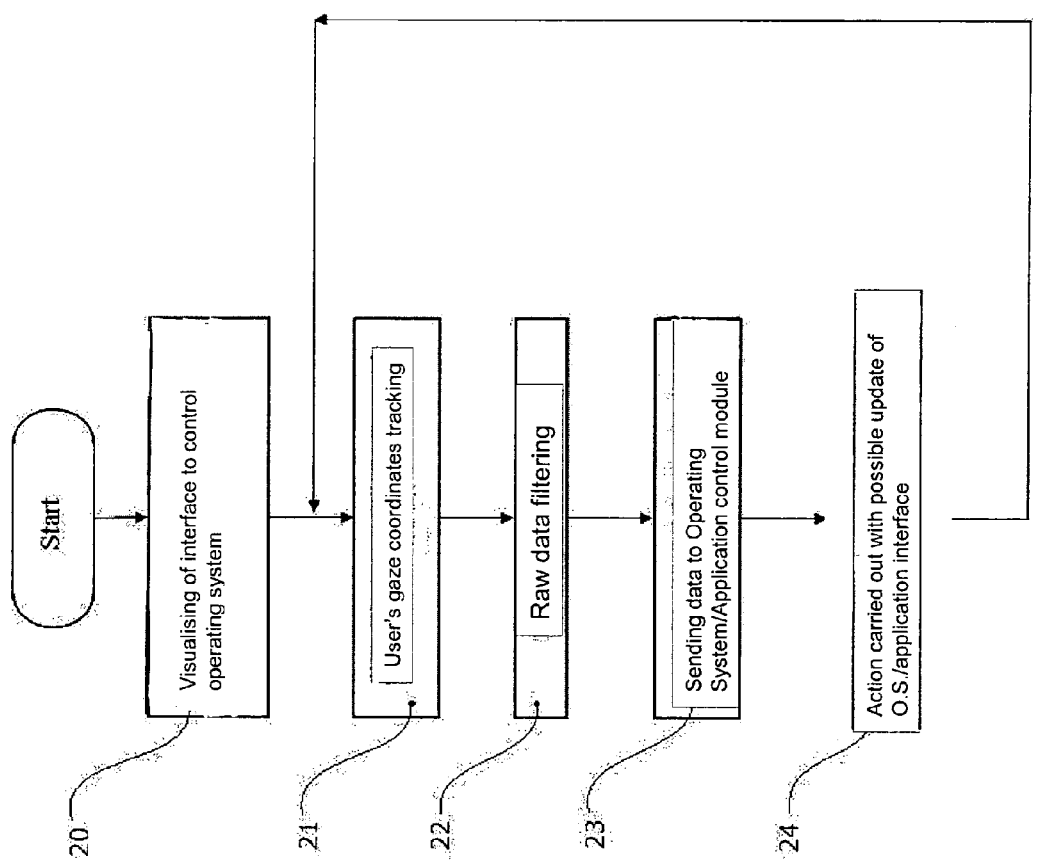
FIG. 2 shows the flow diagram of the method according to the present invention.

In reference to FIG. 2, there is shown a diagram which depicts the operation of the modules mentioned above and the interconnections with each other by illustrating the steps of the method according to the present invention:

a) On said data visualising means associated with said data processing means, a control user interface adapted to permit the user to control the operating system and the application programs associated therewith of said electronic processing means are visualised 20.

b) The coordinates of the user's gaze in the form of rough data, i.e. of samples relating to the coordinates of the gaze of the two separate eyes, which are subject to strong oscillations, are detected by the eye-tracking device 21, comprised in said user interfacing means. These oscillations generally occur about a certain position, but there are also some gazes which are totally erroneous and should be eliminated by means of a filtering operation.

c) Said rough data are filtered 22 so as to make them stable and suitable for providing indications on the fixations of the user, i.e. on the number of gazes of the user within certain surroundings.

d) The filtered data expressed in x, y coordinates of the fixed point are sent 23 to the Operating System/Applications Control Module 11 which processes them by defining the action to be carried out and the modifications to be made on said user interface.

e) The action to be carried out determined by the previous step is performed 23 and, possibly, said control user interface is suitably modified following the action itself.

f) The sequence is repeated starting from step b) until the user decides to leave the application program which he/she is using.

Figure 3:
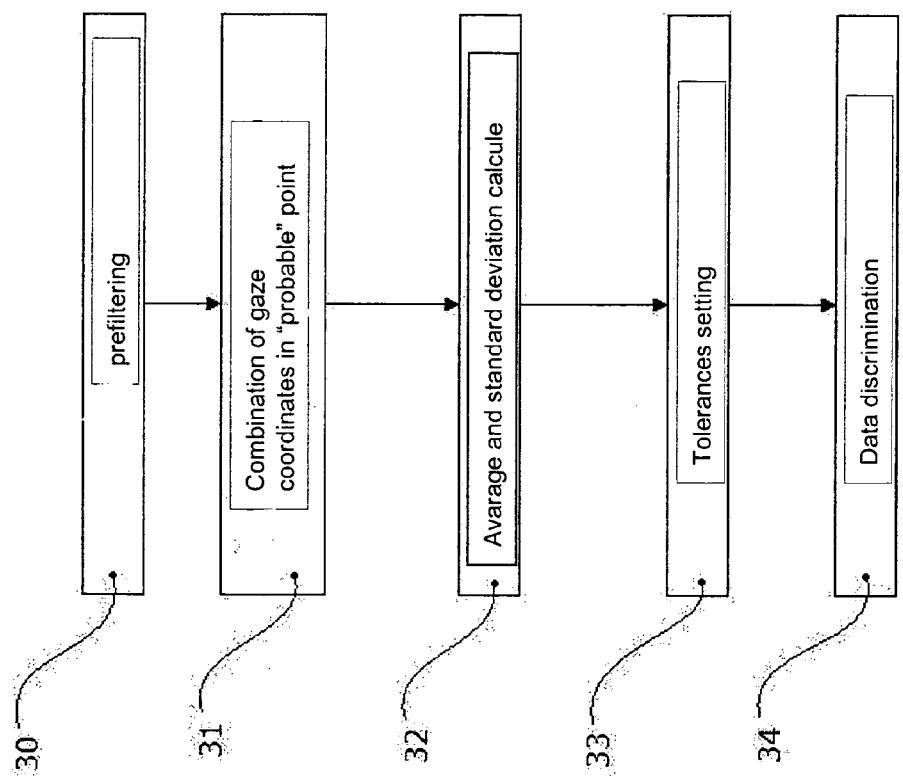
FIG. 3 shows the flow diagram of the module relating to filtering the rough data coming from the eye-tracking device.

The filtering procedure of rough data according to step c) is carried out according to the sequence indicated below and illustrated in FIG. 3:

g) A pre-filtering 30 of the rough data is performed and the non-valid samples are detected and eliminated using, e.g., statistical criteria.

h) The coordinates of the gaze of the right eye and of the left eye are combined 31 in a point deemed probable of being the one fixed by the user.

i) The average and the standard deviation are calculated 32 with respect to the number of samples wanted (defined based on the number of samples which were decided a priori to take into consideration).

j) The tolerances are defined 33 for the evaluations.

k) The acceptable data are discriminated 34 with respect to those to be rejected based on what was established in the previous steps i) and j).

Figure 4:
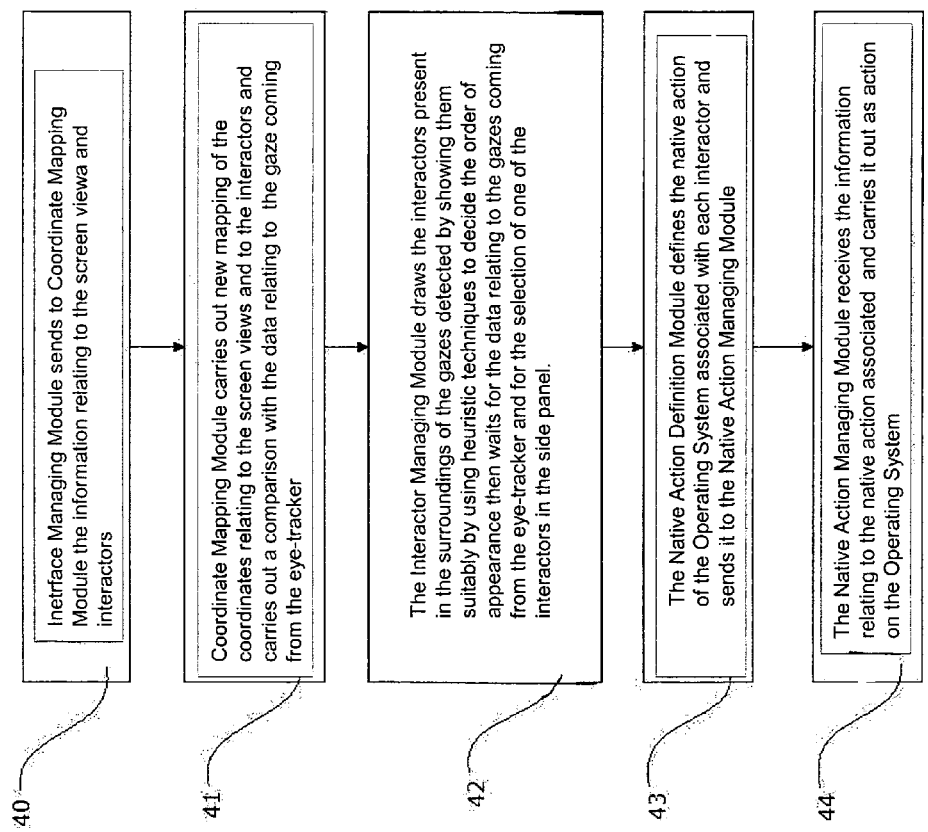
FIG. 4 shows the flow diagram relating to the Application Control Module.

The filtered data sent to the Operating System/Applications Control Module 11 are processed according to the sequence indicated below and illustrated in FIG. 4:

l) The Interface Managing Module 13A analyses the screen views and sends 40 the information relating to the screen views and to the interactors in the current user interface to the Coordinate Mapping Module 12A.

m) The Coordinate Mapping Module 12A carries out new mapping of the coordinates relating to the screen views and to the interactors and carries out a comparison with the data relating to the gaze coming from the eye-tracker. Said new mapping allows the coordinates coming from the Client Module 13 relating to the position of the interactors in the screen views to be defined with respect to another system of axes having different origin than the one based on which the coordinates of the gazes coming from the eye-tracking device are defined. Once this operation has been carried out the comparison permits to understand which interactor is fixed by the user.

n) The Interactor Managing Module 12B draws again 42 the interactors present in the surroundings of the gazes detected by showing them suitably (e.g. on a side panel of the specific user interface of the program) by using heuristic techniques to decide the order of appearance by determining which interactor will be most probably selected. This permits to show each interactor in "weighted" manner, from the most to the least probable. The Interactor Managing Module 12B then waits for the data relating to the gazes coming from the eye-tracker and for the selection of one of the interactors in the side panel.

o) The Native Action Definition Module 12C defines 43 the native action of the Operating System associated with each interactor (i.e. events which are simulated by the Client Module 13 and correspond to insertions of controls from the keyboard, simple click, drag & drop, etc.) and sends it to the Native Action Managing Module 13B.

p) The Native Action Managing Module 13B receives the information relating to the native action associated with the interactor selected and carries it out 44 as action on the Operating System (e.g. send character, mouse movement in specific position, etc.).

Figure 5:
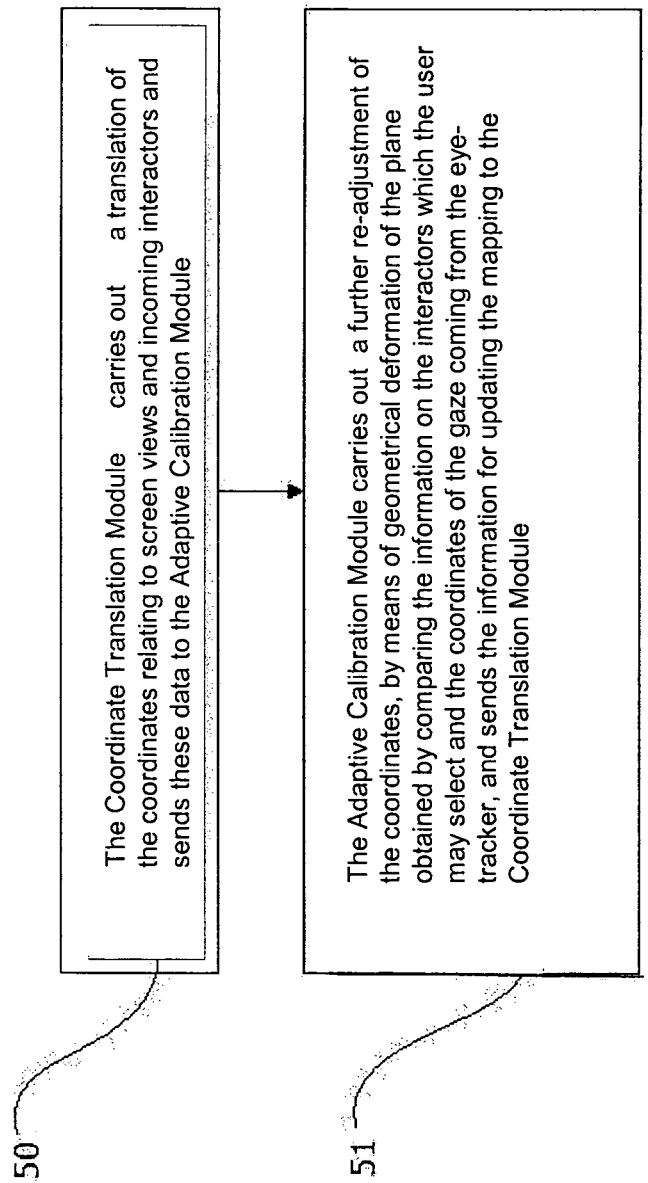
FIG. 5 shows the flow diagram relating to the Coordinate Mapping Module.

The process of mapping the coordinates again according to step m) of the sequence illustrated in FIG. 4 occurs according to the sequence indicated below and illustrated in FIG. 5:

q) The Coordinate Translation Module 14 carries out 50 a translation of the coordinates relating to screen views and incoming interactors and sends these data to the Adaptive Calibration Module 15.

r) The Adaptive Calibration Module 15 carries out 51 a further re-adjustment of the coordinates, by means of geometrical deformation of the plane obtained by comparing the information on the interactors which the user may select and the coordinates of the gaze coming from the eye-tracker, and sends the information for updating the mapping to the Coordinate Translation Module 14.

Figure 6:
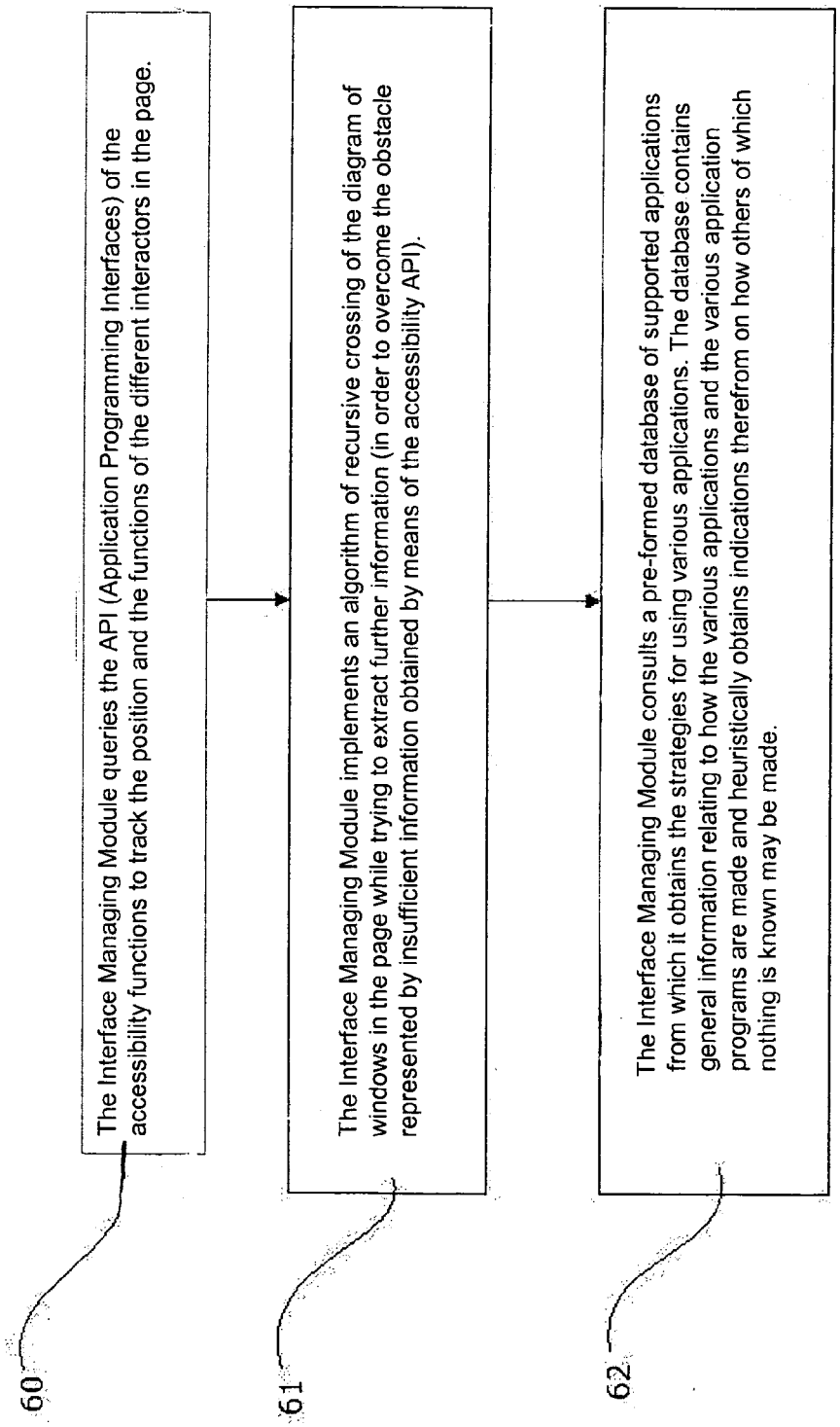
FIG. 6 shows the flow diagram relating to the data recovery strategies relating to the interactors in the screen views.

The Interface Managing Module carries out the search of the interactors in the view screens continuously during the entire process described above, by means of the use of the steps described below and illustrated in FIG. 6:

s) The Interface Managing Module 13A queries 60 the API (Application Programming Interfaces) of the accessibility functions to track the position and the functions of the different interactors in the page.

t) The Interface Managing Module 13A implements 61 an algorithm of recursive crossing of the diagram of windows in the page while trying to extract further information (in order to overcome the obstacle represented by insufficient information obtained by means of the accessibility API).

u) The Interface Managing Module 13A consults 62 a pre-formed database of supported applications from which it obtains the strategies for using various applications. The database contains general information relating to how the various applications and the various application programs are made and heuristically obtains indications therefrom on how others of which nothing is known may be made.

The method described allows, e.g., a disabled user to use a personal computer equipped, e.g., with an operating system and with application programs such as Windows® and the Microsoft® Office® package.

The actions carried out by the user are described below in detail:

The user is arranged in front of the eye-tracker connected to a monitor in which is visualised the screen view of the operating system/application wanted to be controlled by means of ocular movements.

The user fixes, e.g., the Start icon on the Windows® application bar close to which is the icon for the Word® application and the Windows® bar: the gaze moves in specific surroundings for the intrinsic features of the eye-tracker. Due to this and to the possible and intrinsic error of accuracy of the eye-tracking device, what the user is fixing on and what his/her intention is may not be said with certainty. To obviate this problem, all the interactors in the surrounding of the gaze (e.g. Start button, Word® program icon, Windows®) bar) are shown in a side panel, suitably for selection by means of ocular control (well spaced and of suitable sizes). Such interactors are detected by means of suitable data recovery strategies (type, position, etc.) relating to the interactors in the screen view (accessibility API query, recursive crossing of windows diagram, database of predefined applications) and are shown in a "weighted" manner according to the order obtained by means of heuristic techniques (from the most probable to the least probable).

Figure 7:
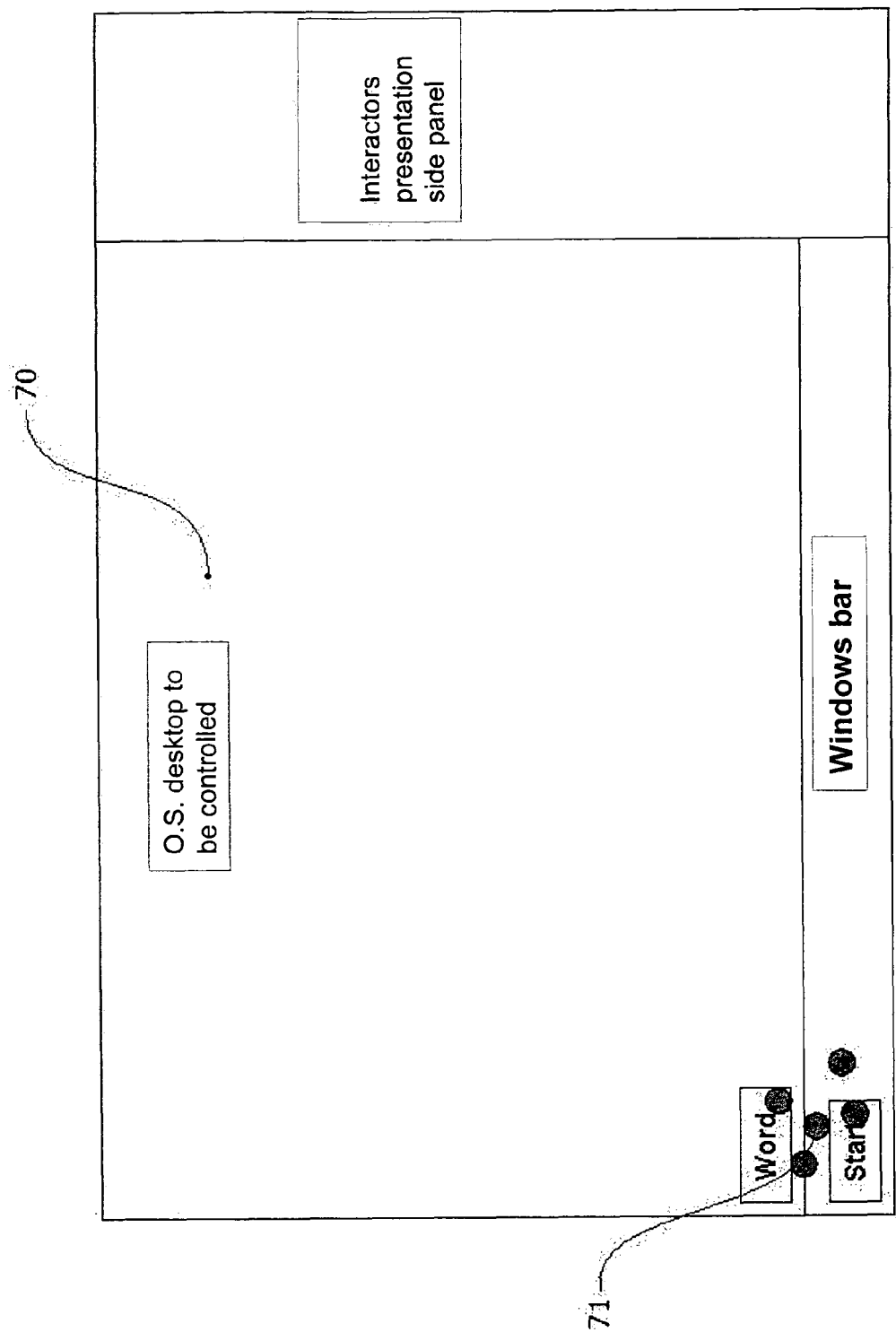
FIGS. 7-10 show, by way of non-limiting example, a possible implementation of the graphic interface of the application object of the present invention.

The user fixes the interactor of interest on the side panel and as the buttons are well spaced and of suitable sizes, there is no ambiguity with respect to the user's choice. The button is therefore selected and the consequent action is carried out. In greater detail and in reference to accompanying FIGS. 7-10, the user, firstly, arranges him/herself in front of the eye-tracker connected to a monitor in which is visualised the screen view 70 of the operation system/application wanted to be controlled by means of ocular movements (FIG. 7).

The user fixes, e.g., the Start icon on the Windows® application bar close to which is the icon for the Word® application and the Windows® bar: the gaze 71 moves in specific surroundings for the intrinsic features of the eye-tracker. Due to this and to the possible and intrinsic error of accuracy of the eye-tracking device, what the user is fixing on and what his/her intention is may not be said with certainty (FIG. 7).

Figure 8:
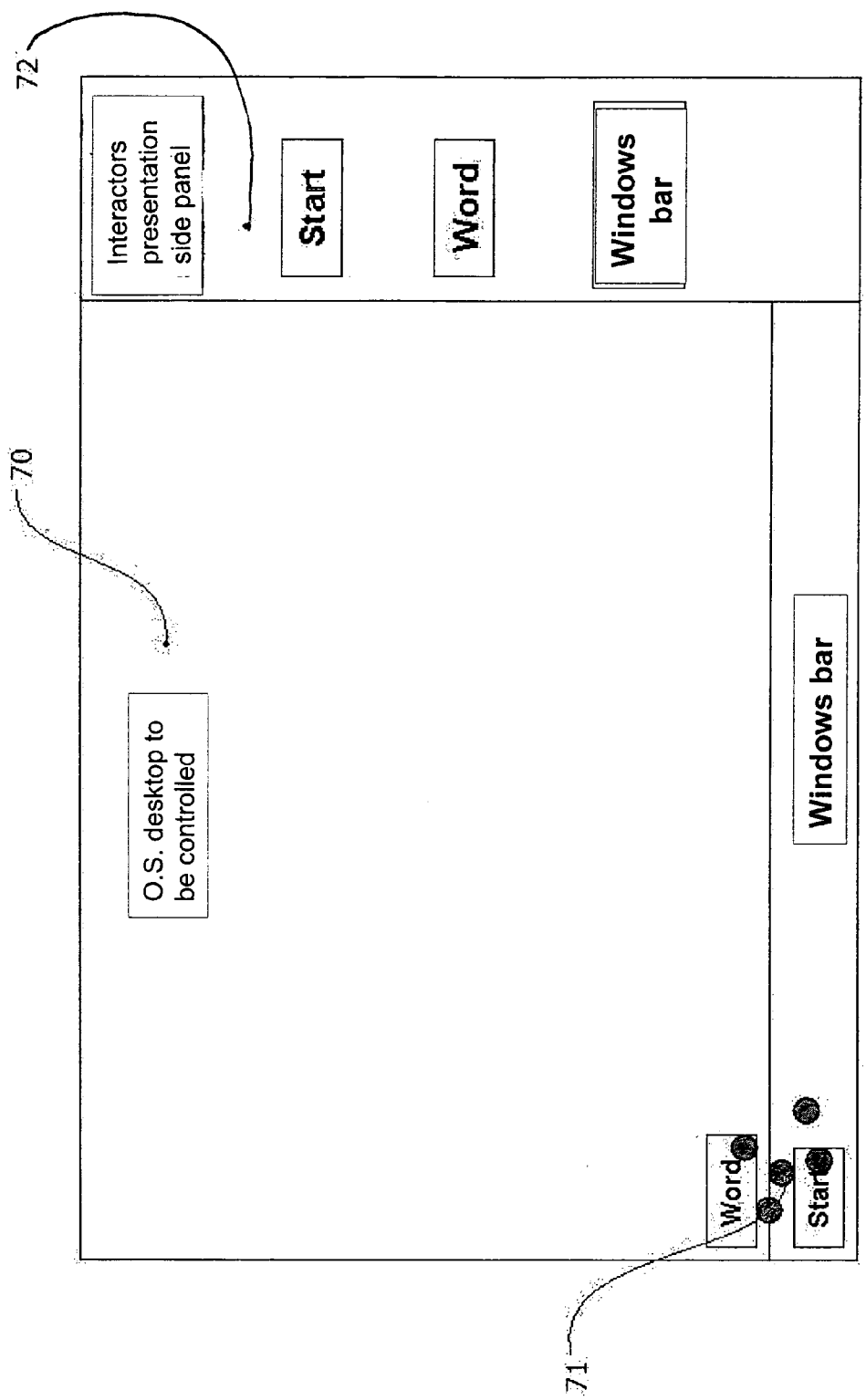

All the interactors in the surrounding of the gaze 71 (e.g. Start button, Word® icon, Windows®) bar) are shown in a side panel 72, suitably for selection by means of ocular control (well spaced and of suitable sizes). Such interactors are detected by means of suitable data recovery strategies (type, position, etc.) relating to the interactors in the screen view (accessibility API query, recursive crossing of windows diagram, database of predefined applications) and are shown in a "weighted" manner according to the order obtained by means of heuristic techniques (from the most probable to the least probable) (FIG. 8).

Figure 9:
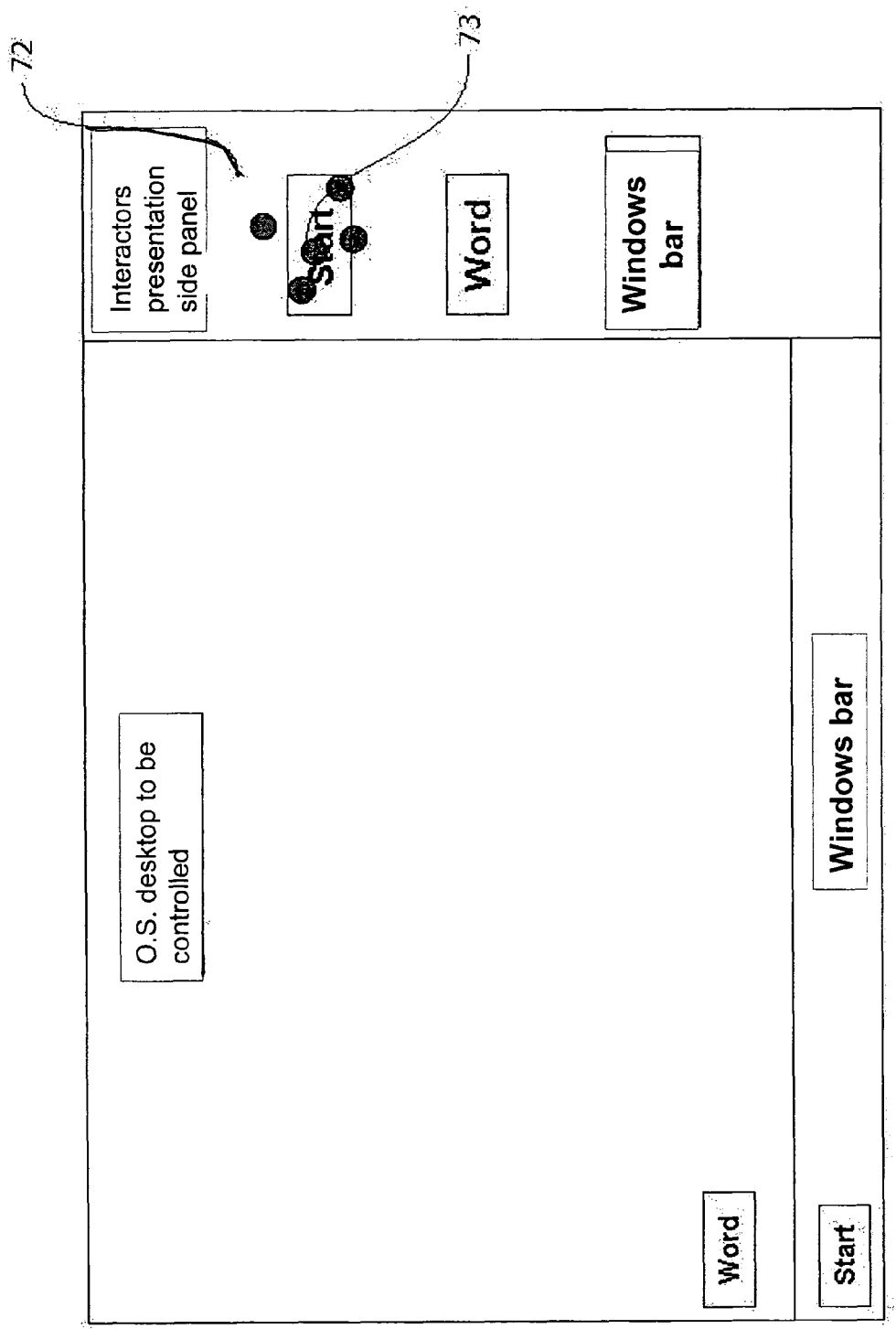
Figure 10:
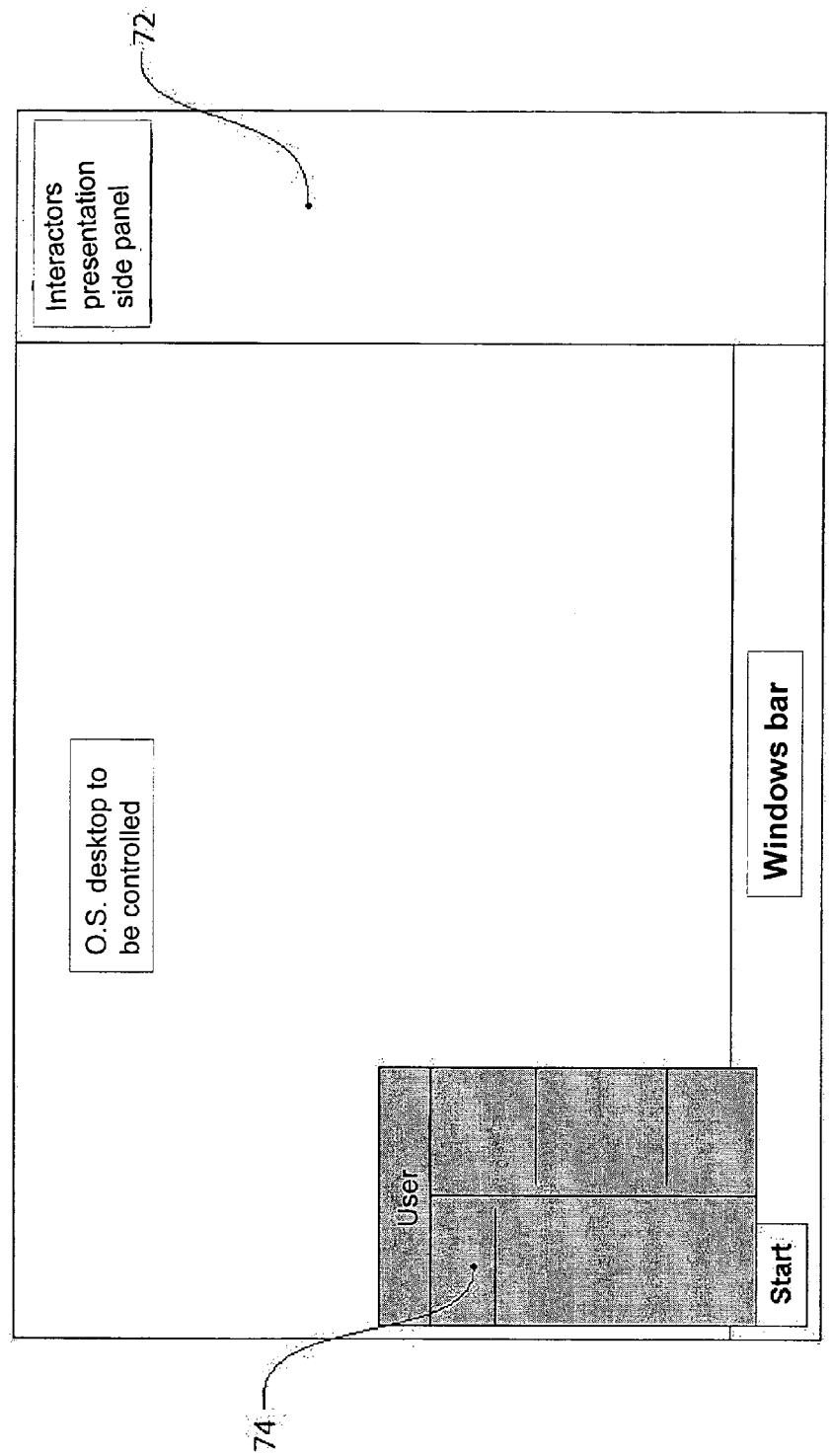

The user fixes the interactor of interest 73 on the side panel 72: as the buttons are well spaced and of suitable sizes, there is no ambiguity with respect to the choice of the user (FIG. 9). The button is selected and the consequent action is carried out.

After the selection of the Start button from the interactors panel, the action is consequently carried out (FIG. 10), or the window is opened 74 relating to the request. The interactors panel 72 is emptied while waiting to be filled again with new interactors following the successive gazes of the user.

The invention claimed is:

1. Method of controlling the operation of an operating system and application programs by ocular control comprises the steps of:

visualizing, on a data visualising means associated with a data processing means, a control user interface that allows a user to control the operating system and the application programs of said data processing means;

detecting, by an eye-tracking device comprised in a user interfacing means associated with the data processing means, coordinates of each user's eyes gaze in a form of rough data samples;

filtering the rough data samples to make the user's eyes gaze coordinates stable for providing indications on the fixations of the user within certain surroundings;

sending the filtered rough data samples in two-dimension Cartesian coordinates of a fixed point to an Operating System and Applications Control Module;

processing, by the Operating System and Applications Control Module, the two-dimension Cartesian coordinates of the fixed point to define a native action to be performed and changes to be made on the control user interface, wherein the Operating System and Applications Control Module controls the operating system and the application programs and runs developing application graphic interfaces, wherein the application graphic interfaces contain information about interactors present in screen views and perform the native action associated with the interactor fixed by the user at that moment, wherein the processing the two-dimension Cartesian coordinates of the fixed point further comprises:

analyzing, by an Interface Managing Module, information relating to the screen views of the operating system and the application programs that the user wants to control by ocular control, wherein the Interface Managing Module sends the information relating to the screen views and the interactors in a current user interface to a Coordinate Mapping Module, conducting, by the Coordinate Mapping Module, a new mapping of the two-dimension Cartesian coordinates relating to the screen views and the interactors based on a comparison with data relating to the gaze coming from the eye-tracker device, wherein the new mapping allows the two-dimension Cartesian coordinates coming from a Client Module relating to a position of the interactors in the screen views to be defined with respect to another system of axes having a different origin than the one system of axes based on which the two-dimension Cartesian coordinates of the gazes coming from the eye-tracking device are defined, wherein the Client Module defines the position and the function of the interactors in the screen view, comparing, by an Interactor Managing Module, incoming user eye gazes to define which of the interactors are being fixated on by the user and present for display the interactors on the control user interface, wherein the Interactor Managing Module draws again the interactors present in the surroundings of the detected gazes by presenting the interactors suitably on a predetermined portion of the control user interface by using heuristic techniques to decide the order of appearance and determine which of the interactors will most likely be selected, wherein a second set of one or more of the interactors, upon defining the one or more of the interactors, are generated and displayed at the predetermined portion of the control user interface, wherein each of the second set of one or more of the interactors comprises a set of instructions defining the native action to control the operating system and the application programs, wherein the Interactor Managing Module waits for the data relating to the user's eyes gazes coming from the eye-tracker device and selection of one of the interactors presented on the side panel of the control user interface defining, by a Native Action Definition Module, the native action associated with each of the interactors of the operating system, wherein the Native Action Definition Module sends the native action associated with each of the interactors of the operating system to the Client Module for successive processing availability, wherein the native action definition corresponds to control events originating from a user interface device including at least one of a keyboard, a mouse click and a drag-and-drop operation, wherein the Native Action Definition Module sends the native action definition associated with each of the interactor of the operating system to the Native Action Managing Module, receiving, by the Native Action Managing Module, information relating to the native action associated with the selected interactor, and performing the native action associated with the selected interactor on the operating system to modify the control user interface according to an occurred action: and repeating the steps of the detecting step, filtering step, sending step and processing step until the user exits the application program currently being used.

2. The method according to claim 1, wherein the step of filtering rough data samples comprises the steps of:

performing a statistical criteria pre-filtering of the rough data samples to detect and eliminate non-valid rough data samples;

combining the coordinates of the gaze of the right eye and of the left eye to determine a probable point of the fixed point by the user;

calculating an average and a standard deviation based on a priori number of samples; defining one or more evaluation tolerances; and discriminating acceptable data with respect to refected data based on the calculated average and standard deviation and the defined evaluation tolerances.

3. The method according to claim 1, wherein the step of conducting of a new mapping of the said coordinates comprises the steps of:

performing, by a Coordinate Translation Module, a translation of the coordinates relating to the screen views and incoming interactors, wherein the Coordinate Translation Module sends the translation of the coordinates relating to the screen views and the incoming interactors to an Adaptive Calibration Module;

performing, by the Adaptive Calibration Module, a readjustment of the coordinates by geometrical deformation of the plane obtained by comparing the information on the interactors which the user may select and the coordinates of the gaze coming from the eye-tracker device, wherein the Adaptive Calibration Module sends the coordinates readjustment information for updating the mapping to the Coordinate Translation Module.

4. The method according to claim 1, wherein the step of analyzing information relating to the screen views includes performing a continuous search for the interactors that are present in the screen views on the display comprises the steps of:

querying, by the Interface managing Module, an Application Programming Interfaces (API) of the accessibility functions to track positions and functions of different interactors present in the screen views;

implementing, by the Interface Managing Module, an algorithm of recursive crossing of a window diagram in the screen views while trying to extract further information in order to overcome the obstacle represented by possibly insufficient information obtained by the API of accessibility;

querying, by the Interface Managing Module, a preformed database of supported said application programs to obtain strategies for using the various application programs, wherein said database contains general information relating to how the various application programs are made.

5. An apparatus of controlling the operation of at least one of an operating system and application programs on a data processor by ocular control comprising:

a display;

an eye-tracking device to interpret a direction of gaze of a user; and a data processor communicably coupled to the display and eye-tracking device, and including a processor coupled to a memory device, said memory device storing a control module and said at least one of the operating system program and application programs, said control module when executed by the processor being operable to:

visualize, on the display, a control user interface that allows the user to visually control the at least one of the operating system and the application programs of said data processor;

detect, by the eye-tracking device coupled to said data processor, a plurality of rough data samples of coordinates associated with a user's gaze at the display, wherein said rough data samples of coordinates includes coordinates of each eye of the user's gaze at the display;

filter the rough data samples to provide indication of fixation of the user by monitoring a predetermined number of gazes by the user over a predetermined time over a user selected area on the display;

send the filtered rough data samples as two-dimension Cartesian coordinates that represent a fixed point of the gaze to an Operating System and Application Control Module;

process, by the Operating System and Application Control Module, the filtered rough data samples as two-dimension Cartesian coordinates to define one or more interactors associated with the fixed point of gaze by the user, wherein the process the filtered rough data samples as two-dimension Cartesian coordinates defining one or more interactors associated with the fixed point of gaze by the user further comprises:

analyze, by an Interface Managing Module, information relating to screen views of the operating system and the application programs that the user wants to control by ocular control, wherein the Interface Managing Module sends the information relating to the screen views and the interactors in a current user interface to a Coordinate Mapping Module, conduct, by the Coordinate Mapping Module, a new mapping of the coordinates relating to the screen views and the interactors based on a comparison with data relating to the gaze coming from the eye-tracking device, wherein the new mapping allows the coordinates coming from a Client Module relating to the position of the interactors in the screen views to be defined with respect to another system of axes having different origin than the one system based on which the coordinates of the gazes coming from the eye-tracking device are defined, wherein the Client Module defines the position and the function of the interactors in the screen views, compare, by the Interactor Managing Module, incoming user eye gazes to define which of the interactors are being fixated on by the user and present for display the interactors on the control user interface, wherein the Interactor Managing Module draws again the interactors present in the surroundings of the detected gazes by presenting the interactors suitably on a predetermined portion of the control user interface by using heuristic techniques to decide the order of appearance and determine which said interactor will most probably be selected, wherein a second set of one or more of the interactors, upon defining the one or more of the interactors, are generated and displayed at the predetermined portion of the control user interface, wherein each of the second set of one or more of the interactors comprises a set of instructions defining native action to control the operating system and the application programs, wherein the Interactor Managing Module waits for data relating to the gazes coming from the eye-tracking device and selection of one of the interactors presented on the side panel of the control user interface, define, by a Native Action Definition Module, the native action associated with each said interactors of the operating system, wherein the Native Action Definition Module sends the native action associated with each of the interactors of the operating system to a Client Module for successive processing availability, wherein the native action definition corresponds to control events originating from a user interface device including at least on of a keyboard, a mouse click and a drag-and-drop operation, wherein the Native Action Definition Module sends the native action definition associated with each said interactor of the operating system to a Native Action Managing Module, receive, by the Native Action Managing Module, information relating to the native action associated with the selected interactor and perform the native action associated with the selected interactor on the operating system to modify the control user interface according to an occurred action: and repeat the steps of the detect step, filter step, send step and process step until the user exits the application program currently being used.

6. The apparatus according to claim 5, wherein said data processor is a personal computer.

7. The method according to claim 1, wherein a second set of one or more interactors are generated and displayed at the predetermined portion comprising the steps of:
determining coordinate mapping of the interactors present at the fixed point of gaze by the user:

mapping new coordinates for displaying the second set of one or more interactors on the display at the predetermined portion; and
correlating the functional actions associated with each of the second set of interactors.

8. The method according to claim 1, wherein the a second set of one or more interactors are generated and displayed at the predetermined portion further comprises providing a predetermined spacing between two or more of the second set of interactors at the predetermined portion.

9. The method according to claim 1, wherein the a second set of one or more interactors are generated and displayed at the predetermined portion further comprises enlarging the one or more of the second set of the interactors at the predetermined portion.

10. The apparatus according to claim 5, wherein said control module when executed by the processor being operable to: filter the rough data samples comprises the steps of:
performing a statistical criteria pre-filtering of the rough data samples to detect and eliminate non-valid rough data samples;
combining the coordinates of the gaze of the right eye and of the left eye to determine a probable point of the fixed point by the user;
calculating an average and a standard deviation based on a priori number of samples;
defining one or more an evaluation tolerances; and
discriminating acceptable data with respect to rejected data based on the calculated average and standard deviation and the defined evaluation tolerances.

11. The apparatus according to claim 5, wherein said control module when executed by the processor being operable to: conduct a new mapping of the coordinates comprises the steps of:
performing, by a Coordinate Translation Module, a translation of the coordinates relating to the screen views and incoming interactors, wherein the Coordinate Translation Module sends the translation of the coordinates relating to the screen views and the incoming interactors to an Adaptive Calibration Module;
performing, by the Adaptive Calibration Module, a readjustment of the coordinates by geometrical deformation of the plane obtained by comparing the information on the interactors which the user may select and the coordinates of the gaze coming from the eye-tracker device, wherein the Adaptive Calibration Module sends the coordinates readjustment information for updating the mapping to the Coordinate Translation Module.

12. The apparatus according to claim 5, wherein said control module when executed by the processor being operable to: analyze information relating to the screen views includes performing a continuous search for the interactors that are present in the screen views on the display comprises the steps of:
querying, by the Interface managing Module, an Application Programming Interfaces (API) of the accessibility functions to track positions and functions of different interactors present in the screen views;
implementing, by the Interface Managing Module, an algorithm of recursive crossing of a window diagram in the screen views while trying to extract further information in order to overcome the obstacle represented by possibly insufficient information obtained by the API of accessibility;
querying, by the Interface Managing Module, a preformed database of supported said application programs to obtain strategies for using the various application programs, wherein said database contains general information relating to how the various application programs are made.

* * * * *